United States Patent [19]

Portalupi et al.

[11] Patent Number: 4,683,020
[45] Date of Patent: Jul. 28, 1987

[54] APPARATUS FOR STORING AND FEEDING TIRE BEADS

[75] Inventors: Steven J. Portalupi, Akron; Robert S. Riggs, Stow, both of Ohio

[73] Assignee: The Goodyear Tire & Rubber Company, Akron, Ohio

[21] Appl. No.: 761,181

[22] Filed: Jul. 31, 1985

[51] Int. Cl.⁴ ............... B29D 30/08; B65G 15/12
[52] U.S. Cl. ................... 156/403; 156/131; 156/556; 198/817; 414/910
[58] Field of Search ............ 156/131, 394, 1, 422, 156/403, 398, 132, 135, 136, 556, 126; 211/1.5, 23; 221/221, 251; 414/910; 198/817, 627, 628

[56] References Cited

U.S. PATENT DOCUMENTS

| | | | |
|---|---|---|---|
| 2,957,572 | 10/1960 | Dvorak | 198/817 X |
| 3,849,231 | 11/1974 | Brey et al. | 156/403 |
| 4,354,892 | 10/1982 | Tarantola | 156/398 |
| 4,581,084 | 4/1986 | Mukae et al. | 156/131 |

Primary Examiner—Donald E. Czaja
Assistant Examiner—Thomas Bokan
Attorney, Agent, or Firm—Frederick K. Lacher; T. P. Lewandowski

[57] ABSTRACT

A rack (28) which supports the beads (12) in a separated condition is transported to the storing and feeding apparatus (10) where the rack (28) is used to place the beads (12) around a plurality of continuous conveyors (20) which are expanded to grip the beads (12). After the rack (28) is removed from the feeding and storing apparatus (10), the conveyors (20) are actuated simultaneously and intermittently to feed the beads (12) to a bead transfer member. The apparatus (10) includes means (64,66,89) to adjust and level the conveyors (20) to accommodate a range of bead sizes and means (118) to insure feeding of one bead (12) at a time.

11 Claims, 8 Drawing Figures

APPARATUS FOR STORING AND FEEDING TIRE BEADS

This invention relates generally to building pneumatic tires wherein annular beads are made by winding wire into bead rings which are then transported to a tire building machine for assembly with the plies and other tire components into a green tire. The green tire may then be placed in a mold and vulcanized.

In the manufacture of tires, it is important that the beads be made with precision and then stored and transported without distortion. Heretofore one bead feeding apparatus has been proposed in which several continuous vertical conveyor chains have been used for supporting beads on clips fastened to the vertical chains. In another feeding apparatus the beads have been stacked on a vertical drum and then raised by spider arms extending through slots in the drum to lift the beads to the top of the drum where the beads are lifted off the stack by a magnetic bead transfer device. Another bead feeding apparatus has a horizontal drum with radially movable sleeve sections at the ends for retracting to receive a stack of beads and expanding to hold the beads. Then at each end a ring is pushed by a sleeve section to move the stack toward the end where the beads are fed individually to the bead transfer member. In still another bead feeding apparatus, the beads have been supported on horizontal rods which have rotatable vanes to separate the beads and are reciprocable for manipulating the beads especially in applications where different size beads are applied.

In the manufacture of certain bead rings it has been found that it is important to handle the beads separately so that they do not stick together. This is especially true of beads which are jammed or crimped in accordance with the disclosure in U.S. Pat. No. 4,452,660 dated June 5, 1984 of Davis et al and allowed Divisional Patent Application Ser. No. 593,561 filed Mar. 26, 1984, now U.S. Pat. No. 4,496,411 dated Jan. 29, 1985, assigned to the Assignee of this application. The beads made with this equipment and process are not wrapped and are preferably not stacked or positioned close together. Accordingly, the apparatus and process of this invention is directed toward conveying the beads to the tire bead storing and feeding apparatus in a rack which supports the beads in a separated condition and then positioning the beads in the separated condition over continuous conveyors of the loading apparatus in which the conveyors are expanded to grip the beads and hold them in the separated condition so that the rack can be removed. The conveyors are then actuated for simultaneous movement toward one end of the conveyors to deliver the beads to a bead transfer apparatus while at the same time maintaining the beads in the spaced condition. Means are also provided to adjust the apparatus to accommodate a range of bead sizes and to insure the feeding of one bead at a time.

In accordance with one aspect of the invention there is provided apparatus for storing and feeding annular beads comprising:

(a) a conveyor assembly having a plurality of continuous conveyors positioned around a central axis and extending in an axial direction for engaging radially inner surfaces of beads placed around the conveyor assembly;

(b) means to move each of the conveyors radially outward of the central axis for urging each of the conveyors into gripping engagement with the beads; and (c) means for driving the continuous conveyors simultaneously and intermittently toward one end of the assembly to feed the beads one at a time.

In accordance with another aspect of the invention there is provided a method of storing and feeding annular beads supplied to a storing and feeding apparatus in a separated condition comprising:

(a) placing a plurality of beads around a conveyor assembly having a plurality of continuous conveyors positioned around a central axis and extending in an axial direction for engaging radially inner surfaces of the beads;

(b) moving the continuous conveyors radially outward of the central axis into gripping engagement with the beads to maintain the separated positions of the beads relative to one another;

(c) actuating all the continuous conveyors simultaneously and intermittently to move the beads toward one end of the assembly and feed one bead at a time.

To acquaint persons skilled in the arts most closely related to the present invention, a certain preferred embodiment thereof illustrating a best mode now contemplated for putting the invention into practice is described herein by and with reference to the annexed drawings forming a part of the specification. The embodiment shown and described herein is illustrative and as will become apparent to those skilled in these arts can be modified in numerous ways within the spirit and scope of the invention defined in the claims hereof.

Figure 1:
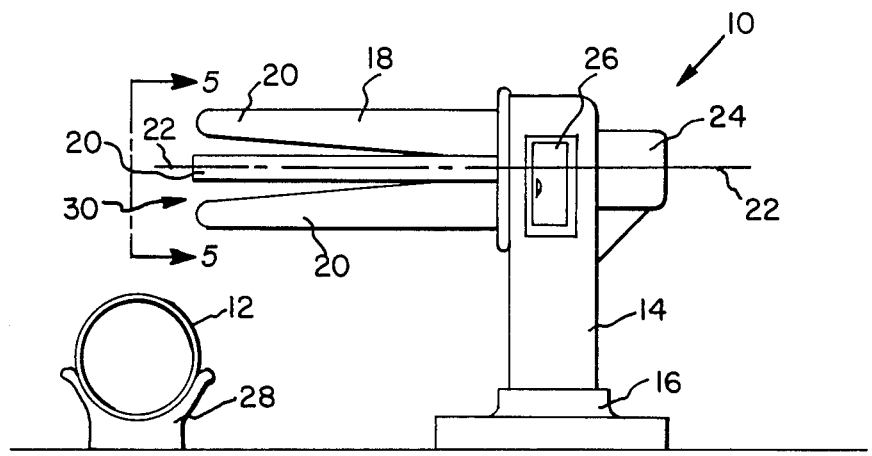
FIG. 1 is a schematic side elevation of an apparatus embodying the invention showing the beads supported in a bead rack before placing on the conveyor assembly.
Figure 2:
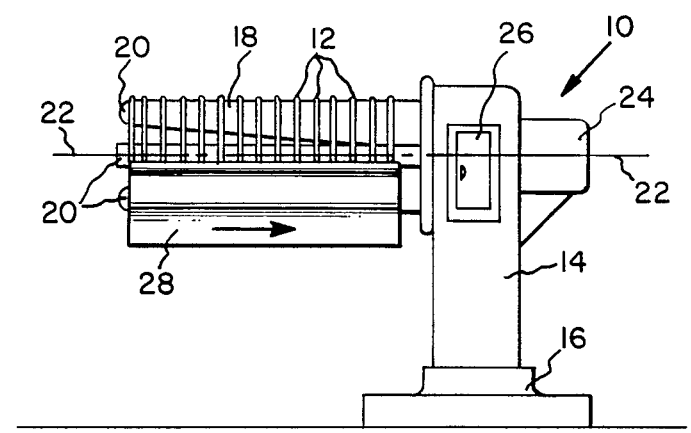
FIG. 2 is an elevation like FIG. 1 showing the beads placed over the conveyor assembly after axial movement of the bead rack.
Figure 3:
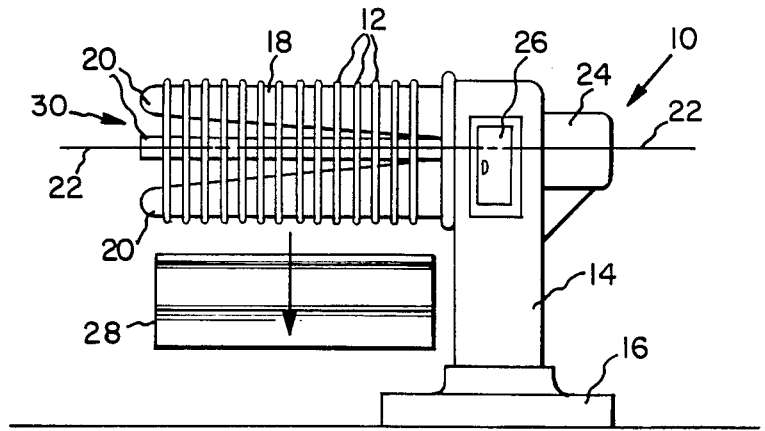
FIG. 3 is an elevation like FIG. 1 showing the beads placed on the conveyor assembly and gripped by expansion of the conveyors with the rack shown after radial movement away from the conveyor assembly.

Referring to the drawings and especially to FIGS. 1, 2 and 3, an apparatus 10 for storing and feeding annular beads 12 is shown which includes a turret 14 swiveled in a stand 16 for mounting on the floor. A conveyor assembly 18 is mounted on the turret 14 and has a plurality of continuous conveyors 20 positioned around a central axis 22—22 of the conveyor assembly for radial movement thereof. A motor 24 for driving the conveyors 20 may be mounted on the turret 14 and controlled by suitable manual or automatic controls 26.

In operation of the apparatus, it is preferable that the annular beads 12 be supplied to the storing and feeding apparatus 10 in a separated condition and this may be accomplished in accordance with the method of this invention by placing the beads in a rack 28 having a generally U-shaped cross section and separators between grooves for receiving the beads 12 after they are assembled on a bead crimping or jamming apparatus and then holding the beads in a separated condition. This is especially important with beads 12 which are not wrapped and have a tacky surface. The loaded rack 28 is transported to the apparatus 10 for storing and feeding the beads 12 from the bead crimping or jamming apparatus and then the rack is moved axially along the conveyor assembly 18 to place the beads around the conveyor assembly as shown in FIG. 2. The continuous conveyors 20 are then moved radially outward of the central axis 22—22 into gripping engagement with the radially inner surfaces of the beads 12 to maintain the beads in the separated positions relative to one another. The rack 28 may then be moved radially of the central axis 22—22 away from the conveyor assembly 18. If desired, the turret 14 may be turned to align the conveyor assembly 18 with a bead transfer ring or other bead transfer apparatus for receiving the beads 12 from the bead storing and feeding apparatus 10. The continuous conveyors 20 may then be simultaneously and intermittently operated to move the beads 12 toward an open end 30 of the conveyor assembly 18 to feed one bead at a time to a suitable bead transfer device for carrying the bead to a tire building machine and positioning the bead on a bead ring of the tire building drum.

Referring to FIGS. 4 through 8, the conveyor assembly 18 is shown in greater detail. A central support member for the conveyor assembly such as cylindrical spindle 32 has a flanged plate 34 at a closed end for mounting on the turret 14. In this embodiment, there are four continuous conveyors 20, each of which has a conveyor support member or belt housing 36. Radially extending slide members such as radially extending rods 38 are mounted on the flanged plate 34 at each side of each belt housing 36 for slidable engagement with collars 40 on supporting brackets 42 mounted on the housing.

Figure 4:
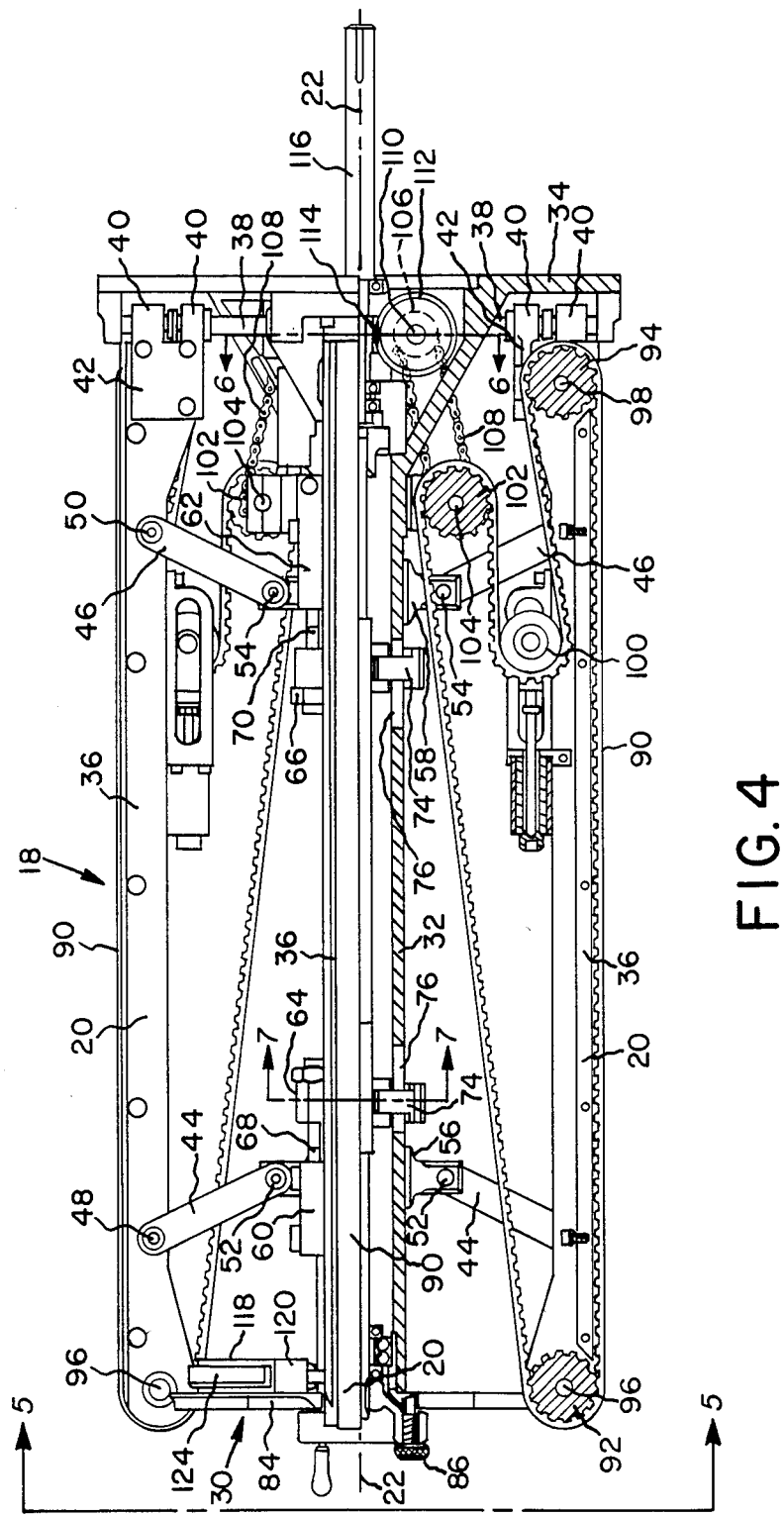
FIG. 4 is a side view, half in section of the conveyor assembly taken along the line 4—4 in FIG. 5.

Each belt housing 36 is moved from an expanded position, shown in FIG. 4, to a contracted position, shown in FIG. 2, by connecting links 44 and 46 pivotally connected to each belt housing at pivot points 48 and 50 and to pivotal connections 52 and 54 mounted on slide members 56 and 58, respectively, slidably mounted on the outer surface of the cylindrical spindle 32. The slide members 56 and 58 include piston and cylinder assemblies 60 and 62 which are connected to stop members 64 and 66 by piston rods 68 and 70, respectively. By communicating air pressure to the piston and cylinder assemblies 60 and 62, the slide members 56 and 58 may be moved toward the stop members 64 and 66 causing the pivotal connections 52 and 54 to move the inner ends of the links 44 and 46 together and thereby retract the belt housing 36 to a position of lesser diameter than that shown in FIG. 4. This is desirable for decreasing the diameter of the conveyor assembly 18 to receive the beads 12 from the rack 28 as shown in FIG. 2.

Figure 7:
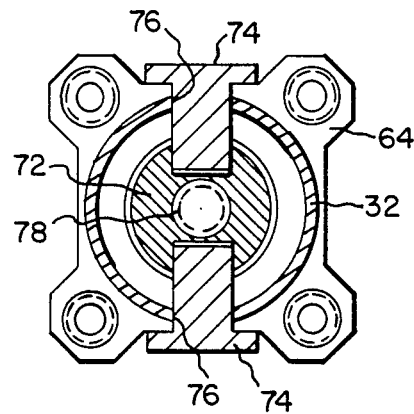
FIG. 7 is an enlarged full sectional view of the bead diameter adjusting mechanism taken along the line 7—7 in FIG. 4.
Figure 8:
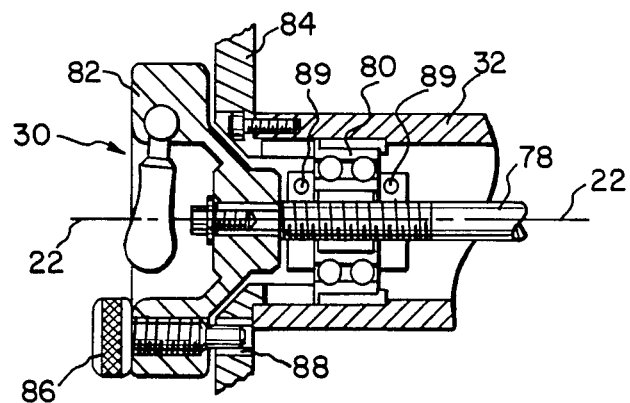
FIG. 8 is a fragmentary sectional view of another portion of the adjusting mechanism taken along the line 8—8 in FIG. 5 showing the alignment leveling adjustment.

As shown in FIGS. 7 and 8, the stop members 64 and 66 are adjustably mounted on the spindle 32. The following description is directed to stop member 64; however, the construction of stop member 66 is the same except for the differences which will be explained hereinafter. A nut 72 is positioned within the spindle 32 and is connected to the slide member 64 by pins 74 extending through slots 76 in the spindle. A shaft 78 is rotatably mounted in the spindle 32 on suitable bearings 80 and is connected to a crank 82 at the open end 30 of the conveyor assembly 18. At the slide member 64, the shaft 78 is in threaded engagement with the nut 72 for moving the slide member upon rotation of the shaft by the crank 82. The threaded connection of the shaft 78 with the nut 72 at the slide member 66 is of opposite hand to the threaded connection at the slide member 64 so that upon turning the shaft in one direction the slide member 64 and slide member 66 will be moved toward each other and upon rotation of the shaft in the opposite direction the slide members will be moved away from each other. This adjustment provides for controlling the expanded position of the belt housings 36 so that the apparatus 10 can be used for different diameter beads 12. Referring to FIG. 8, the crank 82 is located adjacent an end plate 84 bolted to the spindle 32 and has a threaded lock pin 86 engageable with circumferentially spaced holes 88 in the end plate for locking the shaft 78 in the desired position after adjustment of the stop member 64 and 66 for a particular size bead 12.

The axial position of shaft 78 relative to the spindle 32 is maintained by alignment means such as threaded clamp collars 89 at each side of the bearing 80 as shown in FIG. 8. Axial adjustment of the shaft 78 may be desirable to align each belt housing 36 and level each conveyor 20. This is done by loosening the threaded clamp collars 89 and rotating them so that the shaft 78 can be shifted axially in the bearing 80 the desired amount. The clamp collars 89 are then moved to provide a snug fit against the bearing 80 after which they are tightened on the shaft 78.

Figure 5:
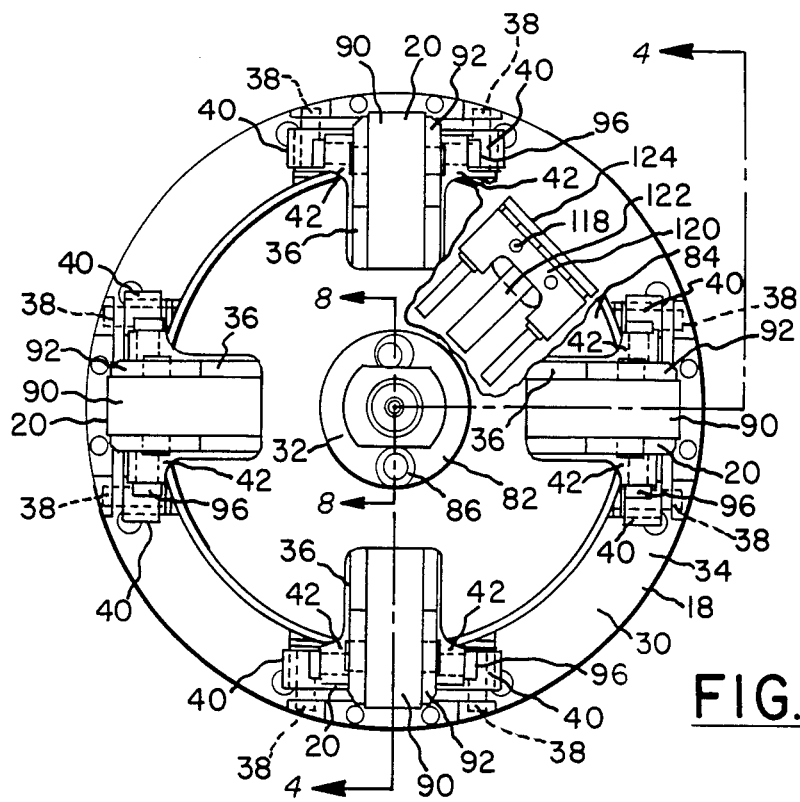
FIG. 5 is an end view of the conveyor assembly taken along the line 5—5 in FIG. 4 with parts being broken away to show the gripping mechanism for the second bead.

As shown in FIGS. 4 and 5, each belt housing 36 carries a timing belt 90 having a belt path extending over idler pulleys 92 and 94 rotatably mounted on shafts 96 and 98, respectively, supported at each end of the belt housing 36. The belt path of the timing belt 90 also extends around take-up pulleys 100 spring mounted on the housing 36.

Figure 6:
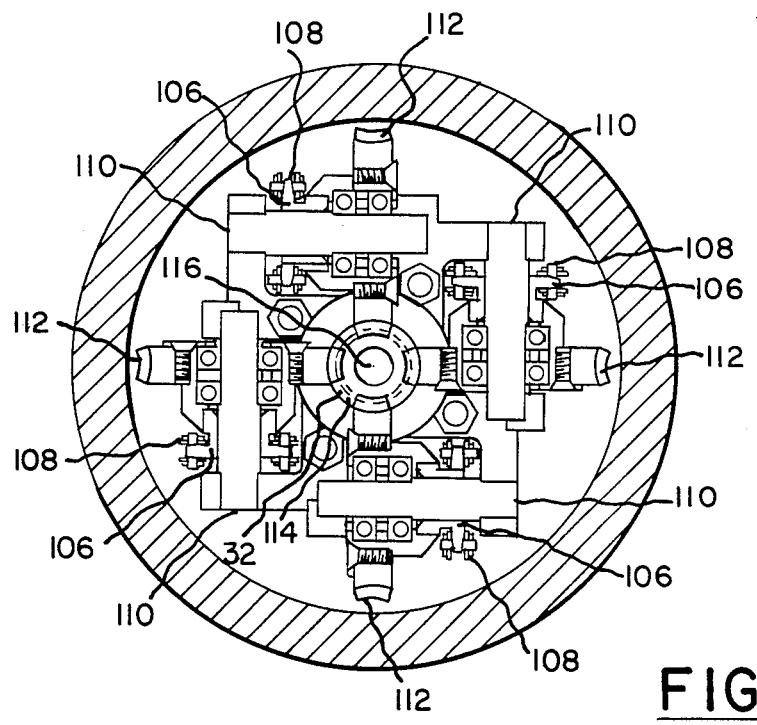
FIG. 6 is a sectional view taken along the line 6—6 in FIG. 4 showing a full section of the worm drive.

The path of the timing belt 90 also extends around a drive pulley 102 mounted on a shaft 104 which is rotatably supported on the spindle 32. A driven sprocket is fastened to the drive pulley 102 and connected to a drive sprocket 106 by a chain 108. The drive sprocket 106, as shown in FIG. 6, is rotatably mounted on a shaft 110 supported by the spindle 32 and is attached to suitable gearing such as driven worm gear 112 having threads in meshing engagement with a worm thread of drive gear 114 on a drive shaft 116 rotatably mounted in the spindle and extending through the turret 14 directly to the motor 24 or to the transmission of the motor for rotating the worm drive gear upon rotation of the drive shaft. Spiral bevel gears may also provide suitable gearing for certain applications.

As shown in FIG. 6, when the drive shaft 116 is rotated the driven worm gear 112 for each belt housing 36 is rotated causing the timing belt 90 of each belt housing to move simultaneously and carry the beads 12 in the separated condition along the conveyor assembly 18. The controls 26 for the motor 24 may be designed in a manner well known in the art to rotate the shaft 116 a predetermined number of revolutions so as to simultaneously move the beads 12 a predetermined distance to feed one bead at a time from the apparatus 10 at the open end 30.

As shown in FIGS. 4 and 5, between each of the belt housings 36, a radially movable stop plate assembly 118 may be mounted on the end plate 84 of the conveyor assembly 18. Each stop plate assembly 118 has a housing 120 containing a piston and cylinder assembly 122 with a piston connected to a stop plate 124 so that when air is communicated to the cylinder of the piston and cylinder assembly, the stop plate will be moved radially outward to a position in the path of the beads 12 on the conveyors 20. The piston and cylinder assembly 122 is actuated after the endmost bead 12 has been moved to a position for transfer to a suitable bead transfer device and will retain the second endmost bead on the conveyor assembly 18.

While a certain representative embodiment and details have been shown for the purpose of illustrating the invention, it will be apparent to those skilled in the art that various changes and modifications may be made therein without departing from the spirit or scope of the invention.

What is claimed is:

1. Apparatus for storing and feeding annular beads conveyed to said apparatus in a rack member which supports said beads in a separated condition comprising:
   (a) a conveyor assembly having a plurality of continuous conveyors positioned around a central axis and extending in an axial direction for positioning of said beads in said separated condition over said conveyor assembly with radially inner surfaces of said beads placed around said conveyor assembly;
   (b) means to move each of said conveyors radially outward of said central axis for urging each of said conveyors into gripping engagement with said beads to maintain said beads in said separated condition while said rack member is being removed; and
   (c) means for driving all of said plurality of continuous conveyors simultaneously and intermittently toward the same end of said assembly to feed said beads one at a time to a transfer apparatus while maintaining the remainder of said beads in said separated condition.

2. Apparatus in accordance with claim 1 wherein said conveyor assembly has a central support member positioned along said central axis, each of said conveyors being mounted on a conveyor support member and said means to move each of said conveyors radially includes connecting links pivotally connected to each said conveyor support member and to said central support member and power means for changing the angular position of said links.

3. Apparatus in accordance with claim 2 wherein each said conveyor support member is slidably mounted at one end on a radially extending slide member carried by said central support member for supporting and guiding said conveyors.

4. Apparatus in accordance with claim 1 wherein said continuous conveyors comprise belts disposed around drive pulleys and idler pulleys mounted on said assembly.

5. Apparatus in accordance with claim 4 wherein said means for driving said continuous conveyors includes a drive gear engageable with a rotatable driven gear of each of said conveyors and a chain drive between a sprocket attached to said driven gear and a sprocket attached to one of said drive pulleys of each of said conveyors providing simultaneous rotation of all of said drive pulleys and movement of all of said belts together upon rotation of said drive gear.

6. Apparatus in accordance with claim 5 wherein said belts are timing belts and said driving pulleys have a ribbed surface for engaging grooves in said timing belts.

7. Apparatus in accordance with claim 1 wherein said means to move each of said conveyors radially outward includes adjustment means for controlling the extent of the radial movement of said conveyors.

8. Apparatus in accordance with claim 7 wherein said adjustment means includes alignment means for aligning and leveling said conveyors after adjustment for radial movement.

9. Apparatus in accordance with claim 7 wherein said conveyor assembly has a central support member positioned along said central axis, and said adjustment means includes axially movable adjustment members slidably supported on said central support member, each of said conveyors being mounted on a conveyor support member, said means to move each of said conveyors radially includes connecting links pivotally connected to said conveyor support member and to said axially movable adjustment members, and said adjustment means comprises means to adjust the axial position of said adjustment members on said central support member.

10. Apparatus in accordance with claim 9 wherein said means to adjust the axial position of said adjustment members is a shaft rotatably mounted on said central support member and threadably engaged with said adjustment member.

11. Apparatus in accordance with claim 10 wherein said adjustment means includes alignment means comprising clamping means to maintain said shaft in a set axial position along said central support member in the clamped condition and permit axial shifting of said shaft for alignment and leveling of said conveyors in the released condition of said clamping means.

* * * * *